United States Patent [19]
Welker

[11] Patent Number: 5,769,388
[45] Date of Patent: Jun. 23, 1998

[54] FLOW DIFFUSER AND VALVE

[75] Inventor: Robert H. Welker, Washington, Tex.

[73] Assignee: Welker Engineering Company, Sugar Land, Tex.

[21] Appl. No.: 848,125

[22] Filed: Apr. 28, 1997

[51] Int. Cl.$^6$ ............................... F16K 47/02; F15D 1/00
[52] U.S. Cl. ...................... 251/118; 137/625.28; 138/37; 138/42
[58] Field of Search ..................................... 251/118, 127, 251/126; 137/625.28, 625.3, 625.38; 138/37, 39, 42, 43

[56] References Cited

U.S. PATENT DOCUMENTS

| | | |
|---|---|---|
| Re. 32,197 | 7/1986 | Self . |
| 1,539,435 | 5/1925 | Schurtz . |
| 1,570,907 | 1/1926 | McKee .............................. 251/127 X |
| 2,198,730 | 4/1940 | Kadenacy .............................. 138/37 X |
| 3,451,404 | 6/1969 | Self . |
| 3,602,262 | 8/1971 | Hinden .............................. 138/37 X |
| 3,776,278 | 12/1973 | Allen . |
| 3,920,044 | 11/1975 | Gruner .............................. 251/127 X |
| 3,990,475 | 11/1976 | Myers . |
| 4,022,423 | 5/1977 | O'Connor et al. . |
| 4,473,210 | 9/1984 | Brighton ............................... 251/127 |
| 5,307,830 | 5/1994 | Welker . |
| 5,454,640 | 10/1995 | Welker . |

OTHER PUBLICATIONS

Fisher Controls International, Bulletin 51.1:ET entitled "Designs ET, EAT, and ETR Control Valve Bodies", May 1991, pp. 1–17.

*Primary Examiner*—Kevin Lee
*Attorney, Agent, or Firm*—Herzog, Crebs & McGhee, LLP

[57] ABSTRACT

A flow diffuser is shown for use with a flow control valve which produces laminar flow patterns in the fluid upon exiting the control valve. The flow diffuser is formed from a cylindrical body and is situated inside a flow control valve. Fluid enters the flow diffuser after passing the poppet. The inlet opening for the flow diffuser is on the axis of the body. The flow is then radially diverted through a plurality of outlet passages. The outlet passages converge to return the flow to a single stream. The walls of the outlet passage are defined by vanes within the body of the flow diffuser. Upon exiting the flow diffuser the fluid enters a transition zone until reaching the outlet port of the flow control valve. The flow diffuser eliminates turbulence, thereby reducing energy loss in the flow, wear on the valve, and noise.

14 Claims, 5 Drawing Sheets

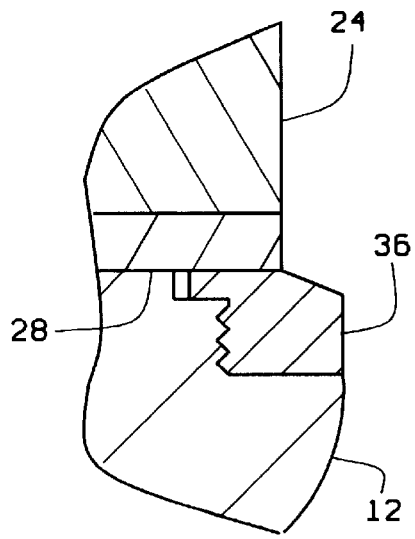
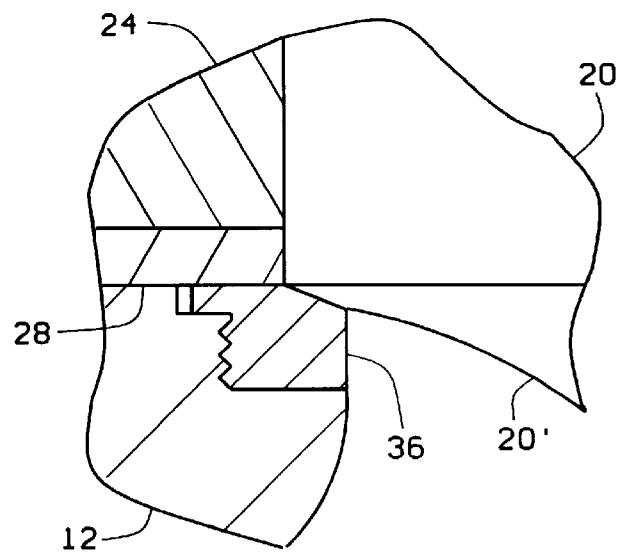
FIG. 2                    FIG. 3
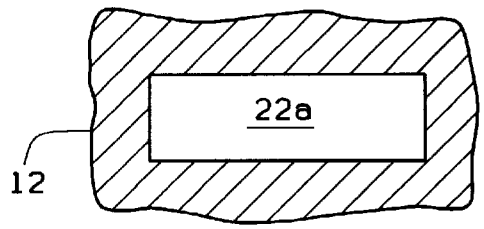
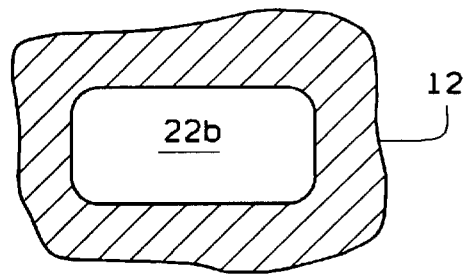
FIG. 5                    FIG. 6
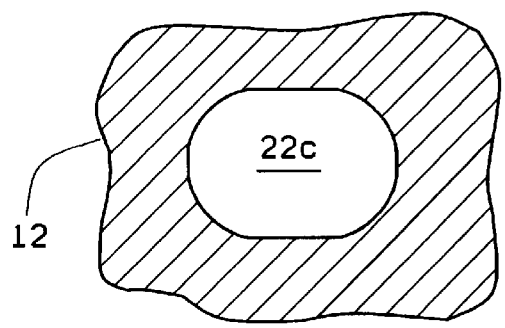
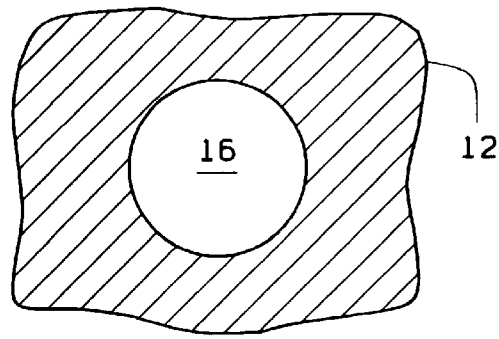
FIG. 7                    FIG. 8

FLOW DIFFUSER AND VALVE

FIELD OF THE INVENTION

The present invention relates to flow diffusers, and more particularly, to a flow diffuser designed for use in a flow control valve.

BACKGROUND OF THE INVENTION

Many industries, including the oil and gas industry, require valves for controlling the flow of fluids. One of the more common designs of these flow control valves in the oil and gas industry is based around a poppet located at the end of a vertical shaft. In order for a horizontally oriented pipeline to make use of the vertically oriented poppet, the fluid is initially directed downward and then back up past the valve seat. The fluid must then be directed back to the original horizontal direction. This sudden change in flow direction causes very turbulent flow patterns including impingement. The same problem exists in right angle valves where the fluid enters the valve already flowing directly at the poppet.

Turbulent flow poses several problems. It causes energy loss in the fluid flow. It can cause damage to the control valve and the surrounding sections of pipeline. Additionally, turbulent flow causes a great deal of noise. Some of these problems have been addressed previously, such as the reduction in noise shown in U.S. Pat. No. 3,900,475 to Myers for a low noise valve trim. Nonetheless, the underlying problem of turbulent flow still exists even in the symptomatic solutions such as Myers.

It is thus an object of this invention to provide a flow diffuser for a flow control valve that produces laminar flow patterns in the fluid upon exiting the valve trim.

It is a further object of this invention to provide a flow diffuser for a flow control valve that reduces impingement and abrasive cutting upon the flow control valve and the surrounding pipeline, thus extending the life of the valve.

It is a further object of this invention to provide a flow diffuser for a flow control valve that reduces the energy loss in the flow, thus reducing the cost of moving the fluid through the valve.

It is yet a further object of this invention to provide a flow diffuser for a flow control valve that limits the noise caused by the flow through the valve.

Other objects of the invention will become apparent from the specification described herein below.

SUMMARY OF THE INVENTION

In accordance with the objects listed above, the present invention is a flow diffuser for a flow control valve that produces laminar flow patterns in the fluid upon exiting the valve. The diffuser consists of a body configured to be placed in the valve housing, and in the preferred embodiment is a cylindrical body that has an axial inlet opening. The flow is then radially diverted through a plurality of outlet passages. The walls of the outlet passages are defined by a series of vanes within the diffuser body. The vanes are curved in such a manner as to cause the outlet passages to converge upon exiting the diffuser, thereby restoring a single laminar flow.

In one form thereof, the present flow diffuser has sixteen (16) outlet passages. To achieve a laminar flow upon exiting, the outlet passages will be of uniform height, but they will narrow in width between the start of each passage and the end thereof. Each passage is preferably the same width at the start, the total combined width of all the outlet passages at the start should be equal to or approximately equal to the circumference of the pipe being used in conjunction with the control valve. For example, with a two-inch diameter pipe and sixteen outlet passages, each passage should be $2\pi/16$, or approximately 0.382 inches wide at the start.

Additionally, the inside height of each outlet passage is preferably approximately one half of the diameter of the pipe being used in conjunction with the control valve. So, in keeping with the example of a two-inch pipe, the outlet passages should be one inch high. At the end of the outlet passages, the total combined cross-sectional area of the outlet passages needs to be very close to the cross-sectional area of the pipe. For example, with the two-inch pipe diameter and sixteen outlet passages, each one inch in height, the outlet passages should each be $\pi/16$, or approximately 0.191 inches wide at the end. It is therefore readily seen that if uniform outlet passage sizes are used, each with a height of exactly one half of the diameter of the pipe, the ratio of the width at the beginning of the outlet passage to the width at the end of the outlet passage will always be 2:1.

The vanes are shaped such that each outlet passage will converge with the adjacent outlet passage. Upon exiting the diffuser, all of the outlet passages have converged thereby producing a laminar flow.

In the preferred embodiment, a transition zone is also included, which extends from the exit of the diffuser to the outlet port of the control valve. The transition zone has a rectangular cross-section at the end proximate the flow diffuser, where the outlet passages all converge. At that point the height of the transition zone is equal to the height of the outlet passages of the flow diffuser and the width of the transition zone is equal to the total combined width of all the outlet passages of the flow diffuser. As the transition zone approaches the outlet port of the control valve, it simultaneously expands in height, narrows in width, and gradually and smoothly changes shape until the cross-section is circular just as it reaches the outlet port of the control valve. The cross-sectional area of the transition zone is constant the entire way therethrough.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein:

FIG. 2 is an enlarged cross-sectional view of the area where the valve seat meets the flow diffuser, with the valve in the open position;

FIG. 3 is an enlarged cross-sectional view of the area where the valve seat meets the flow diffuser, with the valve in the closed position;

FIG. 5 is a cross-sectional view of the transition zone of the present control valve taken along line 5—5 of FIG. 1, proximate to the flow diffuser;

FIG. 6 is a cross-sectional view of the transition zone of the present control valve taken along line 6—6 of FIG. 1, approximately one-third of the way from the flow diffuser to the outlet port;

FIG. 7 is a cross-sectional view of the transition zone of the present control valve taken along line 7—7 of FIG. 1, approximately two-thirds of the way from the flow diffuser to the outlet port;

FIG. 8 is a cross-sectional view of the transition zone of the present control valve taken along line 8—8 of FIG. 1, proximate to the outlet port;

DETAILED DESCRIPTION OF THE DRAWINGS

Figure 1:
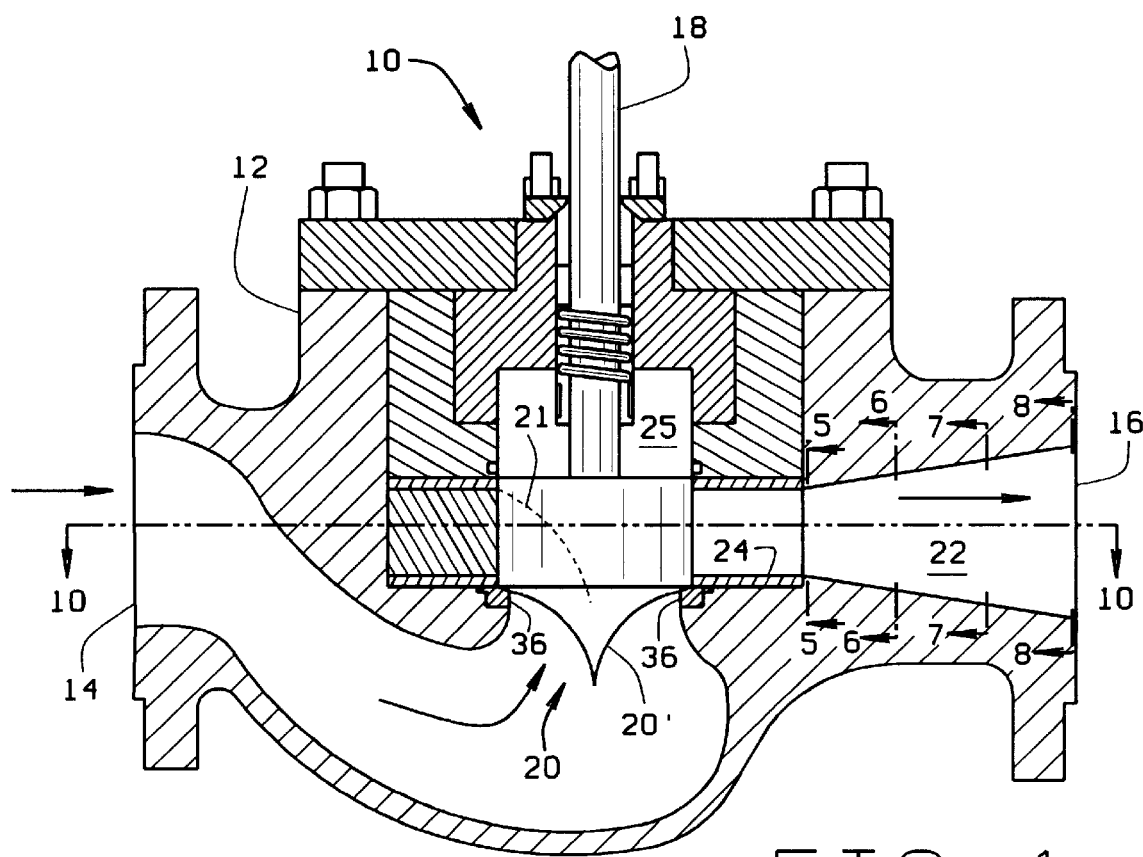
FIG. 1 is a cutaway side view of the present invention installed in a "straight-through" flow control valve.

Referring now to FIG. 1, a flow control valve 10 is shown generally. The control valve 10 comprises a housing 12 with an inlet port 14 and an outlet port 16. The flow direction is shown with arrows. As the fluid comes into the inlet port 14 horizontally, the flow changes directions within the housing 12 until it runs parallel with and directly toward the vertical valve shaft 18.

The shaft 18 is controlled by an actuator (not shown), and is fitted with a poppet 20 on one end. When the valve 10 is in the closed position, the shaft 18 is extended, and the poppet 20 rests on the valve seat 36, forming a seal. FIG. 3 shows an enlarged view of the poppet 20 meeting the valve seat 36.

When the valve 10 is placed in the open position, the actuator raises, retracting the shaft 18, and thus lifting the poppet 20 up into a cavity 25 to bring the curved portion 20' to an upper position shown by phantom line 21 of FIG. 1 and away from the valve seat 36. FIG. 2 shows an enlarged view of the valve seat 36, after the valve 10 has been opened and portion 20' has moved upwardly to position 21 of FIG. 1 and thus out of view in FIG. 2. FIG. 3 shows the position of poppet 20 seated on valve seat 36 as in FIG. 1. The fluid is radially deflected by a curved portion 20' of the poppet 20. The fluid passes through the flow diffuser 24 before being returned to its original flow direction in the transition zone 22.

Figure 9:
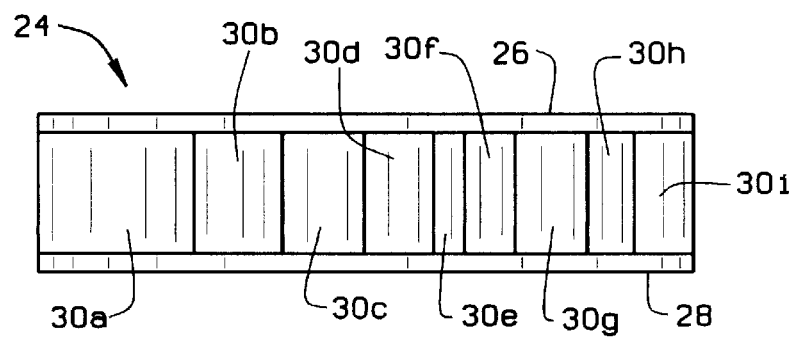
FIG. 9 is an elevation of the preferred embodiment of the present flow diffuser.
Figure 10:
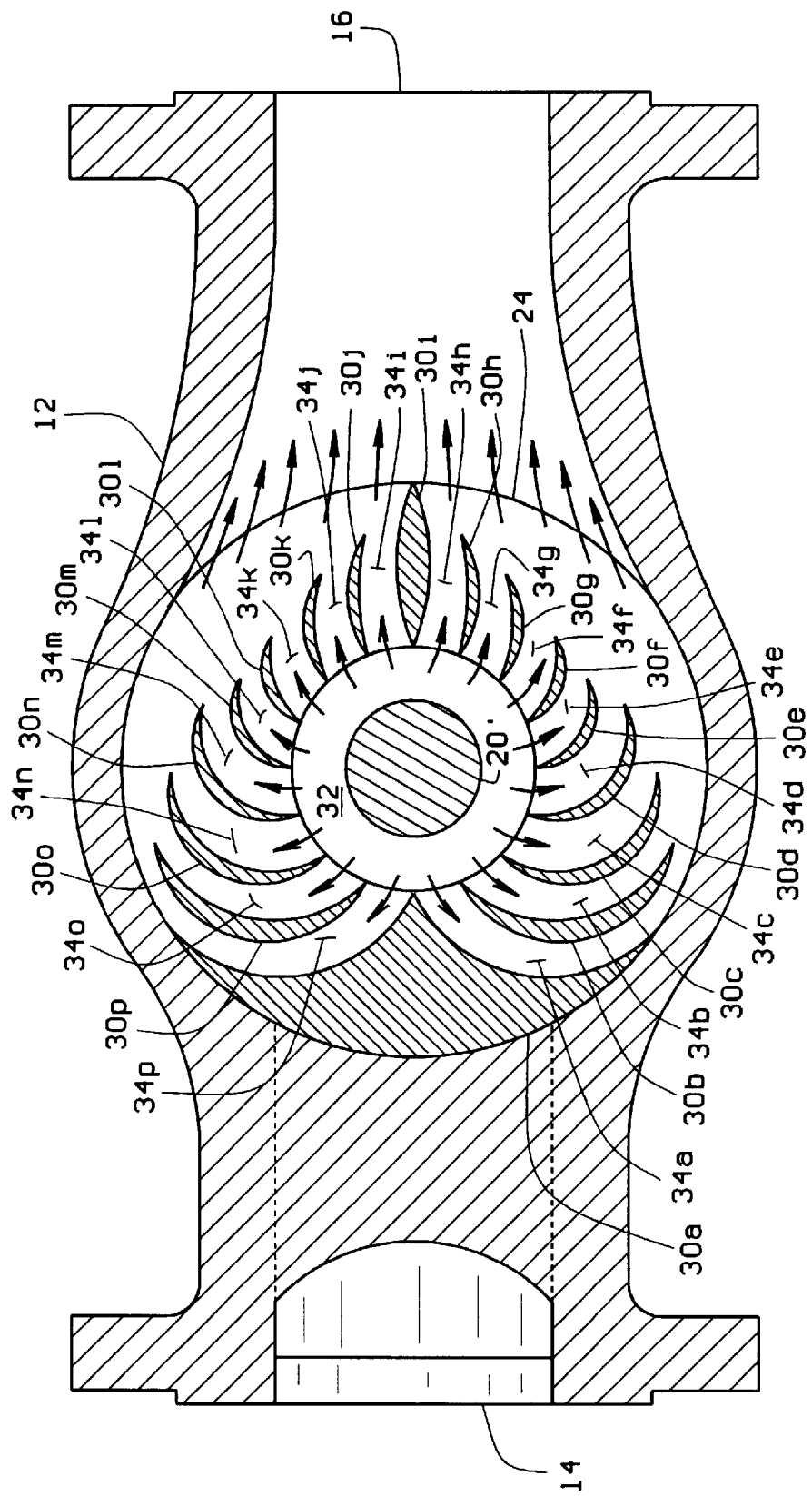
FIG. 10 is an enlarged cross-sectional view taken along line 10—10 of FIG. 1, with poppet 20 shown in its upper position instead of the lower position in FIG. 10 and arrows showing the flow patterns through the diffuser.

Referring now to FIGS. 9 and 10, the flow diffuser 24 is cylindrical in shape, but depends on the shape of the valve chamber or valve control space. Thus, other configurations are possible and contemplated while following the principles set forth herein. As the fluid is deflected by and passes the poppet 20, it flows through the inlet opening 32 of the flow diffuser 24 and out through a plurality of outlet passages 34a–p (34 generally).

The outlet passages 34 are delimited on the top and bottom by the cylinder top 26 and the cylinder bottom 28. Ideally, the inside height (the distance between the bottom of the cylinder top 26 and the top of the cylinder bottom 28), of the outlet passages 34 is equal to half of the diameter of the inlet and outlet ports 14 and 16. The outlet passages 34 are delimited laterally by vanes 30a–p (30 generally). The vanes 30 direct the outlet passages 34 into convergence with one another, thereby redirecting the flow to its original direction while still maintaining a laminar flow pattern.

To maintain the laminar flow pattern and reduce impingement, every direction in which the fluid may flow from the inlet opening 32 as it is deflected by the poppet 20, should lead directly to an outlet passage 34. Therefore, the width of each outlet passage 34 at the start is preferably equal to the circumference of the inlet opening 32 divided by the number of outlet passages 34. Sixteen (16) outlet passages 34 has been found to be an ideal number, though more or less will also work. This is summarized by the equation below, where $w_s$ is the width of the outlet passages 34 at the start, $d_i$ is the diameter of the inlet opening 32, and n is the number of outlet passages 34.

$$w_s = d_i \pi / n$$

To return the total cross-sectional area of the flow to its original size, the outlet passages 34 narrow as they proceed further from the inlet opening 32. As the outlet passages 34 reach the outside of the flow diffuser 24, each should have a width equal to the cross-sectional area of the outlet port 16 divided by the height of the outlet passages 34, and further divided by the number of outlet passages 34. This is summarized by the following equation where $w_e$ is the width of the outlet passages 34 at the end, h is the height of the outlet passages 34, n is the number of outlet passages 34, and $d_o$ is the diameter of the outlet port 16:

$$w_e = d_o^2 \pi / (4hn)$$

Assuming the height of the outlet passages 34 is exactly half of the diameter of the inlet opening 32, and the inlet opening 32 and outlet port 16 are the same size the above equations reduce to the outlet passages 34 being exactly one half of its starting width by the time it reaches the outer edge of the flow diffuser 24:

$$w_e = w_s / 2$$

To help maintain laminar flow, a transition zone 22 is preferably included within the control valve 10 between the flow diffuser 24 and the outlet port 16. This transition zone 22 begins with a rectangular cross section as seen in FIG. 5, showing the transition zone proximate to the flow diffuser 24. The height of the rectangle is the same as the height of the outlet passages 34, and the width of the rectangle is the total combined width of all of the outlet passages 34. Therefore, with a two-inch pipe diameter and a one-inch outlet passage 34 height, the transition zone 22 begins as a rectangle one inch high and $\pi$ inches wide.

As the transition zone 22 is traversed, the cross-sectional shape, though maintaining the same area, transforms smoothly into a circle. As can be seen in FIG. 8, by the time the transition zone 22 reaches the outlet port 16, it is a circle with the same diameter as the outlet port 16. FIGS. 6 and 7 show the transformation of cross-sectional shape at one third and two thirds of the way through the transition zone 22, respectively.

Figure 11:
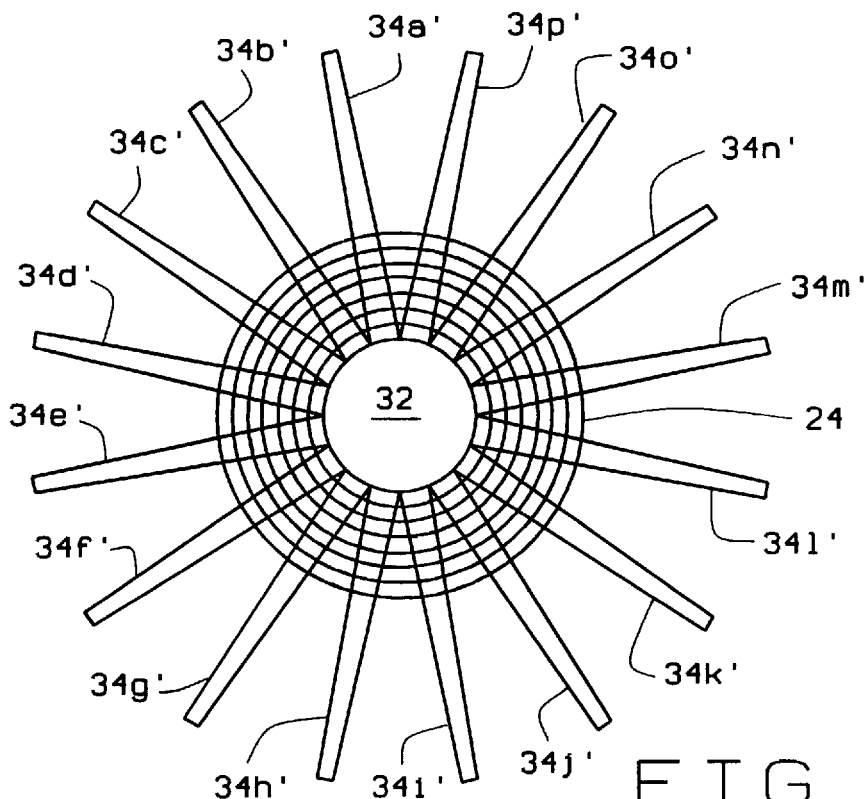
FIG. 11 is a geometric representation of the outlet passages of the present flow diffuser, without convergence.
Figure 12:
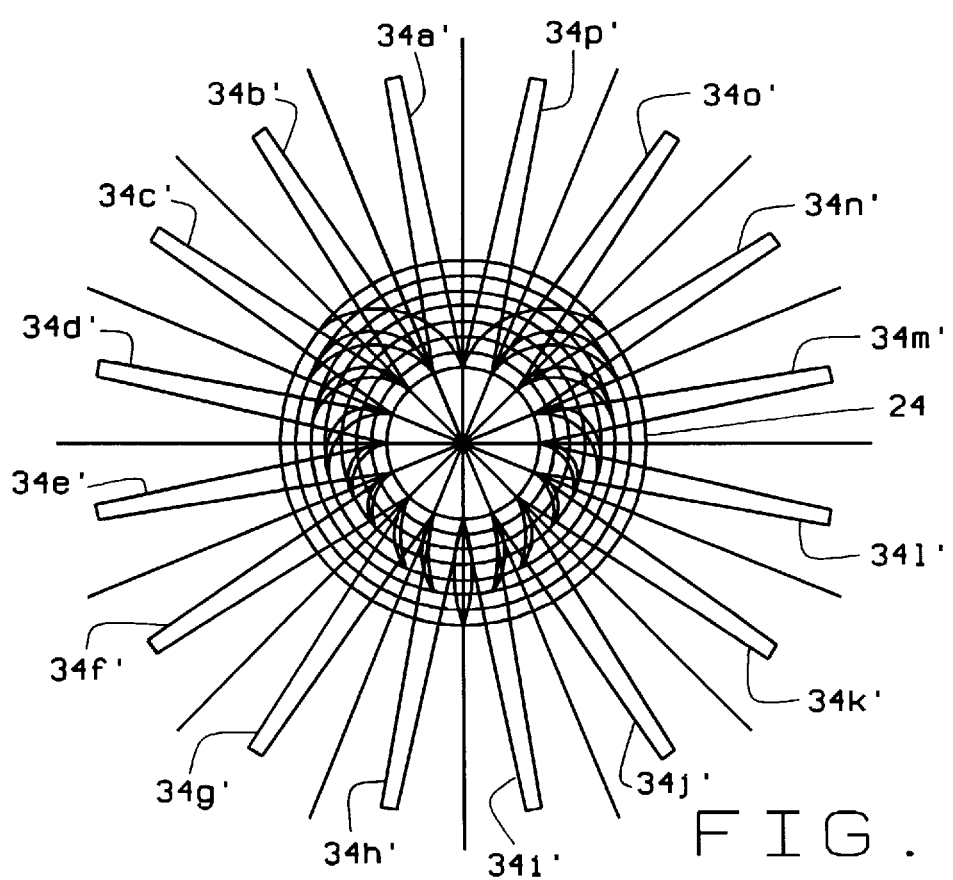
FIG. 12 is a geometric representation of the outlet passages of the present flow diffuser, after convergence.

The shape of the vanes 30 is mathematically defined, as shown in FIGS. 11 and 12. To determine the shape of the vanes 30, virtual representations of outlet passages 34a–p'

(34' generally) are drawn as extending straight from the inlet opening 32. The number of the outlet passage representations 34' may vary but sixteen (16) has been found to be ideal and is preferred. Of course, it should be noted that the number of outlet passage representations 34' will be equal to the number of actual outlet passages 34 in the flow diffuser 24. Each outlet passage representation 34' should touch the adjacent outlet passage representations 34' at the start. At an arbitrary distance from the start, each outlet passage representation 34' should be reduced in width so that the total combined flow area out of the outlet passage representations 34' is equal to the total flow area out of the inlet opening 32. As discussed above if the height of the outlet passages 34 is one half the diameter of the inlet opening 32, each outlet passage representation 34' should be half as wide at the end as at the start.

Each outlet passage representation 34' is bent toward the original flow direction, until it converges with the adjacent outlet passage representation 34'. Since the outlet passage representation 34' narrows as it progresses, this bending causes gaps to form. These gaps define the vanes 30a–p (30 generally). The remaining spaces between the vanes are the actual outlet passages 34. It should be readily seen that the number of vanes 30 is equal to the number of outlet passages 34.

Once the shape of the vanes 30 are determined, the flow diffuser 24 can be created by precision casting (lost wax method), a method well known in the art of metallurgy. The flow diffuser 24 may also be removed from the housing 12 of the valve 10, and therefore replaced if necessary.

Figure 4:
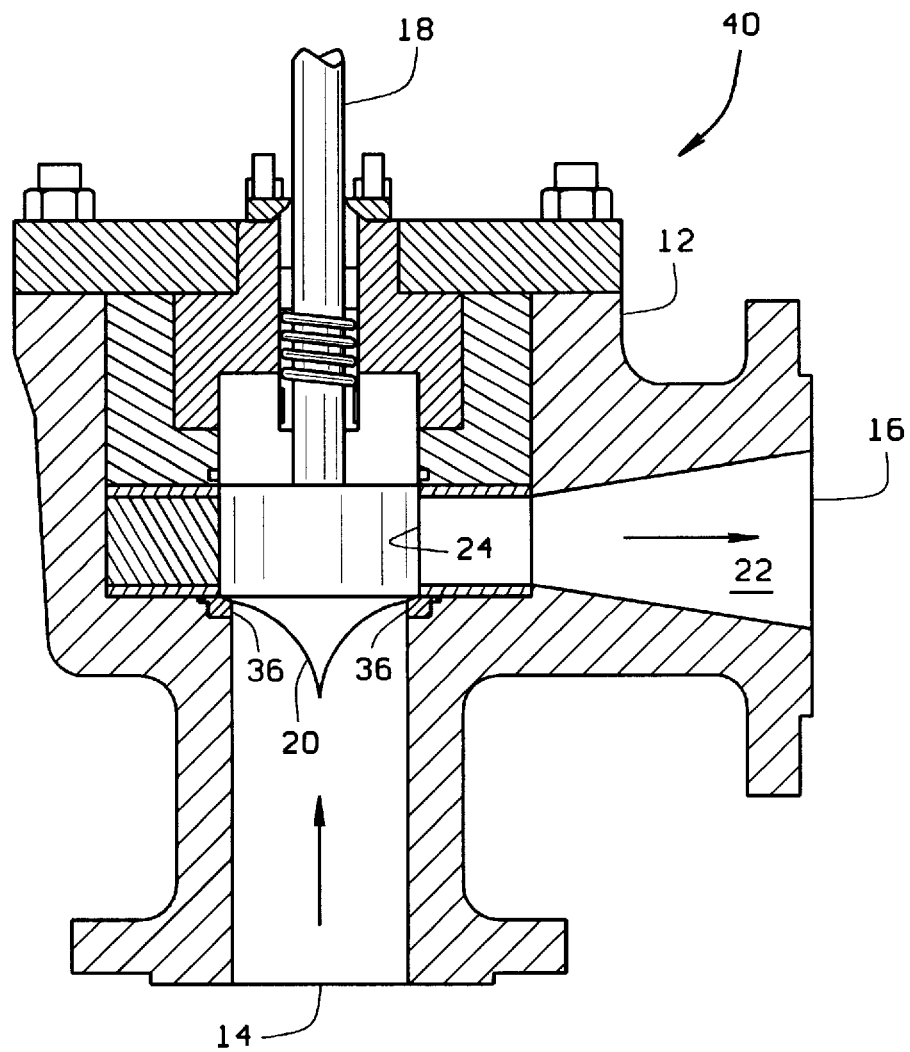
FIG. 4 is a cutaway side view of the present invention, similar to that of FIG. 1, except installed in a "right-angle" flow control valve.

FIG. 4 shows a right angle valve 40 incorporating the present invention. The only difference between the right angle valve 40 and the straight-through valve 10 is that the fluid, as it passes the inlet port 14 is already flowing parallel to and directly at the poppet 20. Thus, when the fluid exits the flow diffuser 24 (and also the outlet port 16), it is flowing perpendicular to the direction it was originally flowing when it entered the valve 40. All other aspects of the valve work as previously described.

While the foregoing is directed to the preferred embodiments of the present invention, other and further embodiments of the invention may be devised without departing from the basic scope thereof, and the scope thereof is determined by the claims which follow.

What is claimed is:

1. A flow diffuser producing a laminar flow for use in a control valve comprising:

an annular body configured to rest in a control valve space having a top and bottom wall defined by outer top and bottom flat surfaces spaced, respectively, from an inner upper surface and an inner lower surface; and an outer curved side surface; said body being of an axial height and a radial annular length, and having an outlet flow direction perpendicular to said axis;

a cylindrical inlet opening through said body along said axis;

a plurality of vanes extending axially from said inner upper surface to said inner lower surface to define a plurality of outlet passages each having a start in fluid communication with and evenly disposed about the outside of said inlet opening, the width of each said start being substantially equal to the circumference of said body divided by the number of said outlet passages, said outlet passages outwardly curved toward said outlet flow direction until all said outlet passages adjoin without overlap.

2. The flow diffuser of claim 1, wherein said body is cylindrical.

3. The flow diffuser of claim 2, comprising exactly sixteen (16) said outlet passages.

4. The flow diffuser of claim 2, wherein said outlet passages have a uniform width at said start and a separate narrower uniform width at said end.

5. The flow diffuser of claim 4, wherein the height of said outlet passages is equal to one half of the diameter of said inlet opening, and the total area of said ends of said outlet passages equal to the cross sectional area of said inlet opening.

6. A valve for controlling the flow of a fluid and producing a smooth outlet flow comprising:

a body having an inlet port and an outlet port;

a valve seat positioned between said ports;

a poppet retractably positioned on said valve seat, said poppet preventing the flow of fluid through said body except when said poppet is retracted from said valve seat;

a flow diffuser mounted within said body and centered around said poppet, said flow diffuser comprising an annular diffuser body having a top and bottom wall defined by outer top and bottom flat surfaces and, respectively, an inner upper surface and an inner lower surface; an outer curved side surface, an axis, an axial height, a radial annular length, and an outlet flow direction perpendicular to said axis, a cylindrical inlet opening through said diffuser body along said axis; a plurality of vanes extending axially from said inner upper surface to said inner lower surface defining a plurality of outlet passages between said walls, each outlet passage having a start and an end, said start of said outlet passages in fluid communication with and evenly disposed about the outside of said inlet opening, the width of each start being substantially equal to the circumference of said diffuser body divided by the number of said outlet passages, said outlet passages curved toward the axis of said diffuser body until all said outlet passages are adjoining without overlap, and a flow deflector affixed to said poppet, adapted to deflect flow of a given fluid radially away from said poppet and through said inlet opening of said flow diffuser when said poppet is retracted from said valve seat.

7. The valve of claim 6, comprising exactly sixteen (16) outlet passages of said flow diffuser.

8. The valve of claim 6, wherein said outlet passages of said flow diffuser have a uniform width at said start and a separate narrower uniform width at said end.

9. The valve of claim 8, wherein the height of said outlet passages of said flow diffuser is equal to one half of the diameter of said inlet opening, and the total area of said ends of said outlet passages equal to the cross-sectional area of said inlet opening.

10. The valve of claim 9, further comprising a transition zone within said body having a start adjoining said diffuser body and an end adjoining said outlet port, said transition zone having a uniform cross-sectional area, a rectangular cross-section at said start and a circular cross-section at said end, said start having a height equal to height of said outlet passages of said flow diffuser.

11. A flow diffuser for use in a control valve, the flow diffuser comprising:

a body defining a top surface, a bottom surface, and a side surface;

an inlet in said bottom surface, and an internal outlet in fluid communication with said inlet, said internal outlet defined at least in part by a plurality of outlet passages each having a beginning and an end, said beginnings diverging radially outward from the inlet and said outlet passages defined by a plurality of vanes disposed between said beginnings and said ends, said outlet passages configured to direct fluid flow in a direction perpendicular to said inlet, said outlet passages lying in a common plane with each other and being curved towards said outlet flow direction and said passages converging at said ends.

12. The flow diffuser of claim 11, wherein said outlet passages are curved towards said outlet flow direction within a plane perpendicular to an axis of said body until all said ends are adjoining without overlap, said inlet being coaxial with said axis of said body.

13. The flow diffuser of claim 11, wherein said outlet passages have a uniform width at said beginning and a separate and narrower uniform width at said end.

14. The flow diffuser of claim 11, having sixteen (16) said outlet passages.

\* \* \* \* \*